United States Patent [19]
Jones et al.

[11] Patent Number: 5,462,764
[45] Date of Patent: Oct. 31, 1995

[54] METHOD FOR CONSTRUCTING A SPRAY IN PLACE STRUCTURE

[76] Inventors: Greg Jones, 1340 Paseo Gracia, San Dimas, Calif. 91773; Daryn Wyatt, 8581 Hamilton, Alta Loma, Calif. 91701

[21] Appl. No.: 283,587

[22] Filed: Aug. 1, 1994

Related U.S. Application Data

[62] Division of Ser. No. 225,752, Apr. 11, 1994, which is a continuation of Ser. No. 931,144, Aug. 17, 1992, abandoned.

[51] Int. Cl.$^6$ ........................................................ B05D 1/34
[52] U.S. Cl. ........................ 427/196; 427/407.1; 427/421; 427/426; 239/336; 239/DIG. 8; 30/128; 30/264; 83/343
[58] Field of Search ........................ 427/196, 426, 427/407.1, 421; 239/336, DIG. 8; 30/128, 264; 83/343

[56] References Cited

U.S. PATENT DOCUMENTS

| | | | |
|---|---|---|---|
| 1,990,584 | 2/1935 | Dolbey | 239/142 |
| 3,006,797 | 10/1961 | Labino | 156/296 |
| 3,096,225 | 7/1963 | Carr et al. | 156/181 |
| 3,111,272 | 11/1963 | Underdown et al. | 239/420 |
| 3,155,320 | 11/1964 | Jones | 239/417.5 |
| 3,185,396 | 5/1965 | Black | 239/336 |
| 3,212,691 | 10/1965 | Lockshaw | 239/336 |
| 3,249,307 | 5/1966 | Peeps et al. | 239/336 |
| 3,258,207 | 6/1966 | Cody | 239/336 |
| 3,305,150 | 2/1967 | Campbell et al. | 239/336 |
| 3,478,963 | 11/1969 | Winn, Jr. | 239/381 |
| 3,504,861 | 4/1970 | Peeps et al. | 239/300 |
| 3,829,016 | 8/1974 | Scharfenberger | 239/127 |
| 3,947,962 | 4/1976 | Smith et al. | 239/336 |
| 4,081,904 | 4/1978 | Krohn et al. | 30/128 |
| 4,738,723 | 4/1988 | Frizzell et al. | 106/202 |

*Primary Examiner*—Shrive Beck
*Assistant Examiner*—David M. Maiorana
*Attorney, Agent, or Firm*—Blakely, Sokoloff, Taylor & Zafman

[57] ABSTRACT

A system for cutting and spraying a plurality of resin strands with an emulsion. The system includes a spray gun that has a cutter assembly that cuts a single resin thread into a plurality of individual strands. The cutter assembly is constructed to cut the strands into varying lengths. The strands are blown from the gun by a housing that is connected to a source of pressurized air. The housing has a pair of openings that are adapted to blow the strands parallel with the gun, so that the resin lies flat on the working surface. The gun also has a pair of nozzles attached to the housing and coupled to a progressive cavity pump that supplies an emulsion. The nozzles are adapted to spray the emulsion into the path of the resin spray, so that the resin and emulsion are mixed onto the working surface.

9 Claims, 6 Drawing Sheets

METHOD FOR CONSTRUCTING A SPRAY IN PLACE STRUCTURE

This is a divisional of application Ser. No. 08/225,752, filed Apr. 11, 1994, which is a continuation of Ser. No. 07/931,144 filed on Aug. 17, 1992 now abandoned.

BACKGROUND OF THE INVENTION

1. Field of the Invention

The present invention relates to an emulsion/resin composition that is sprayed onto a working surface with a spray gun that cuts the resin into strands having varying lengths.

2. Description of Related Art

There has existed building materials which can be constructed by spraying a working surface with an emulsion. The emulsion is typically a mixture of asphalt, clay and water. After the emulsion is sprayed onto the surface, the water evaporates and the asphalt hardens into a solid structure. Such a process is typically used to cover the roof of a building.

To improve the strength of the asphalt structure, a resin is typically sprayed with the emulsion. The resin adds stiffness to the structure and prevents the asphalt from easily cracking or tearing. The most commonly used resin is fiber glass which is cut into strands and blown onto the working surface with the asphalt emulsion.

U.S. Pat. No. 3,155,320 issued to Jones; U.S. Pat. No. 3,947,962 issued to Smith et al; U.S. Pat. No. 3,111,272 issued to Underdown et al and U.S. Pat. Nos. 3,249,307 and 3,504,861 issued to Peeps et al, disclose spray guns used to spray emulsion and glass fibers onto a surface. The spray guns have a cutting wheel that is typically rotated by a friction wheel which feeds a single fiber glass thread between the two wheels. The cutting wheel has a number of blades that can rotate and cut the thread into individual strands. The strands are then blown by the spray gun onto the working surface. The blades of the cutting wheel are spaced apart an equal distance, so that the individual strands all have the same length. The guns typically have a pair of nozzles that are attached to a pressurized source of emulsion. The nozzles are oriented to spray the emulsion into the path of the strands, so that the emulsion and strands are mixed together on the surface.

As disclosed in U.S. Pat. No. 3,829,016 issued to Scharfenberger, the typical length of a resin strand is between 0.5–1.5 inches. Although using glass strands of such size is an effective way of spraying and mixing the resin with the emulsion, it has been found that the resulting harden composition is relatively weak.

U.S. Pat. No. 3,096,225 issued to Carr et al and U.S. Pat. No. 3,212,691 issued to Lockshaw disclose a method of constructing an emulsion/resin composition by blowing a continuous strand(s) of fiber glass onto the working surface. Although a continuous strand of fiber increases the strength of the resulting asphalt composition, it is difficult to make the single strand lie flat on the working surface. As discussed in the Carr patent, after the emulsion and glass resin are sprayed onto the working surface, the emulsion/resin material must be flattened to form a smooth uniform composition. Such a process increases the time and cost of constructing the structure. It would therefore be desirable to have a system that produces a strong emulsion/resin composition that can be efficiently sprayed onto a working surface.

SUMMARY OF THE INVENTION

The present invention is a system for cutting and spraying a plurality of resin strands with an emulsion. The system includes a spray gun that has a cutter assembly that cuts a single resin thread into a plurality of individual strands. The strands are blown from the gun by a housing that is connected to a source of pressurized air. The housing has a pair of openings that are adapted to blow the strands parallel with the gun, so that the resin lies flat on the working surface. The gun also has a pair of nozzles attached to the housing and coupled to a progressive cavity pump that supplies an emulsion. The nozzles are adapted to spray the emulsion into the path of the resin spray, so that the resin and emulsion are mixed onto the working surface.

The cutter assembly is constructed to cut the strands into varying lengths. In the preferred embodiment, the resin spray includes long strands that are up to 24 inches long and short strands that are typically less than 3 inches long. The strands intertwine in the emulsion to provide a structure that is significantly stronger than emulsion/resin compositions found in the prior art.

Therefore it is an object of the present invention to provide an emulsion/resin composition that is significantly stronger than emulsion/resin structures in the prior art.

It is also an object of the present invention to provide a spray gun that can cut a single thread of resin into a plurality of individual strands, wherein at least two of the strands have a different length.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
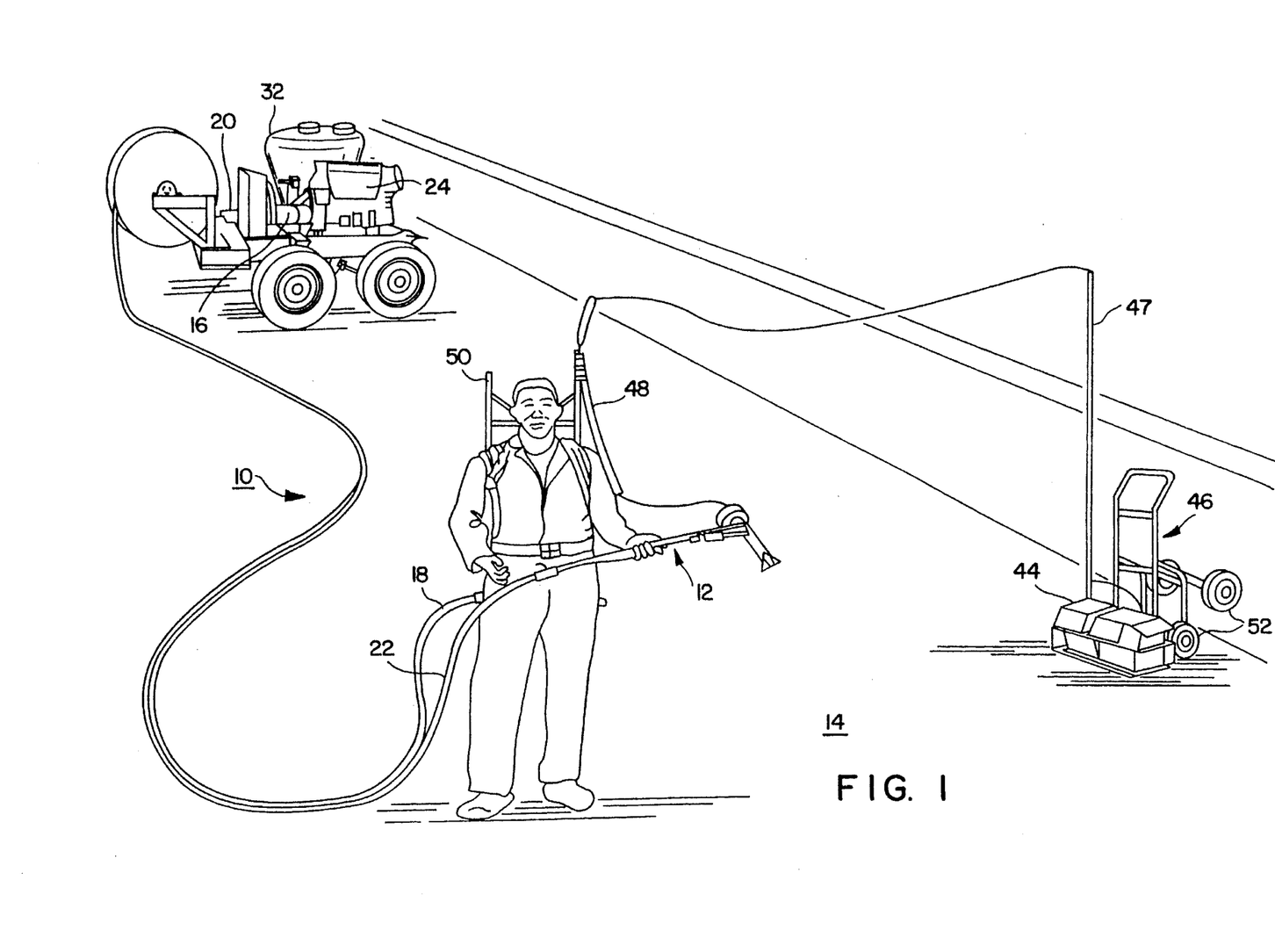
FIG. 1 is a perspective view of a system that can spray an emulsion/resin onto a working surface.

Referring to the drawings more particularly by reference numbers, FIG. 1 shows a system 10 of the present invention. The system 10 includes a spray gun 12 that is held by an operator. The spray gun 12 is used to spray an emulsion and a resin onto a working surface 14. The emulsion is usually an asphalt composition and the resin is typically a fiberglass, although it is to be understood that the emulsion and resin may be any material. For example, the resin may be polyester, NYLON, KEVLAR or an organic material such as cotton. The working surface 14 is typically the roof of a building.

The emulsion is sprayed with the resin onto the roof, wherein the emulsion cools and dries into a solid asphalt composition. The emulsion/resin is typically sprayed onto an existing roof to cover and seal the top of the building. The emulsion/resin can also be used to create a roof by spraying a layer of the asphalt composition onto a form. Although the system is described as being used on roof, it is to be understood that the present invention can be used to create an emulsion/resin composition as, or on any structure. For example, the emulsion/resin may contain fiber glass with a fiber glass binder that are typically used to construct or repair the hull of a boat.

Figure 2:
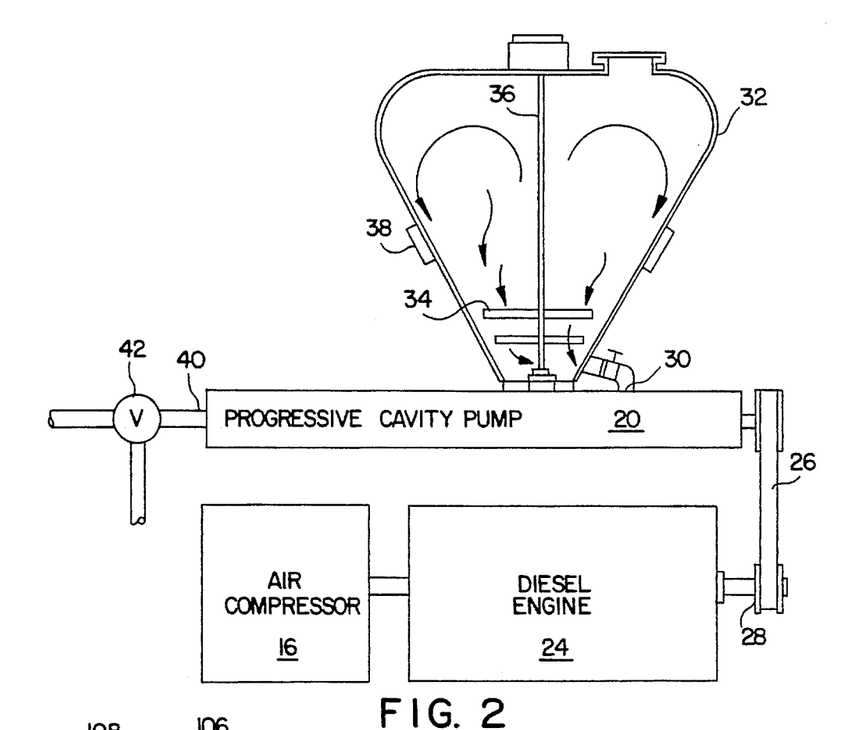
FIG. 2 is a schematic of an engine connected to a compressor and a pump.
Figure 3:
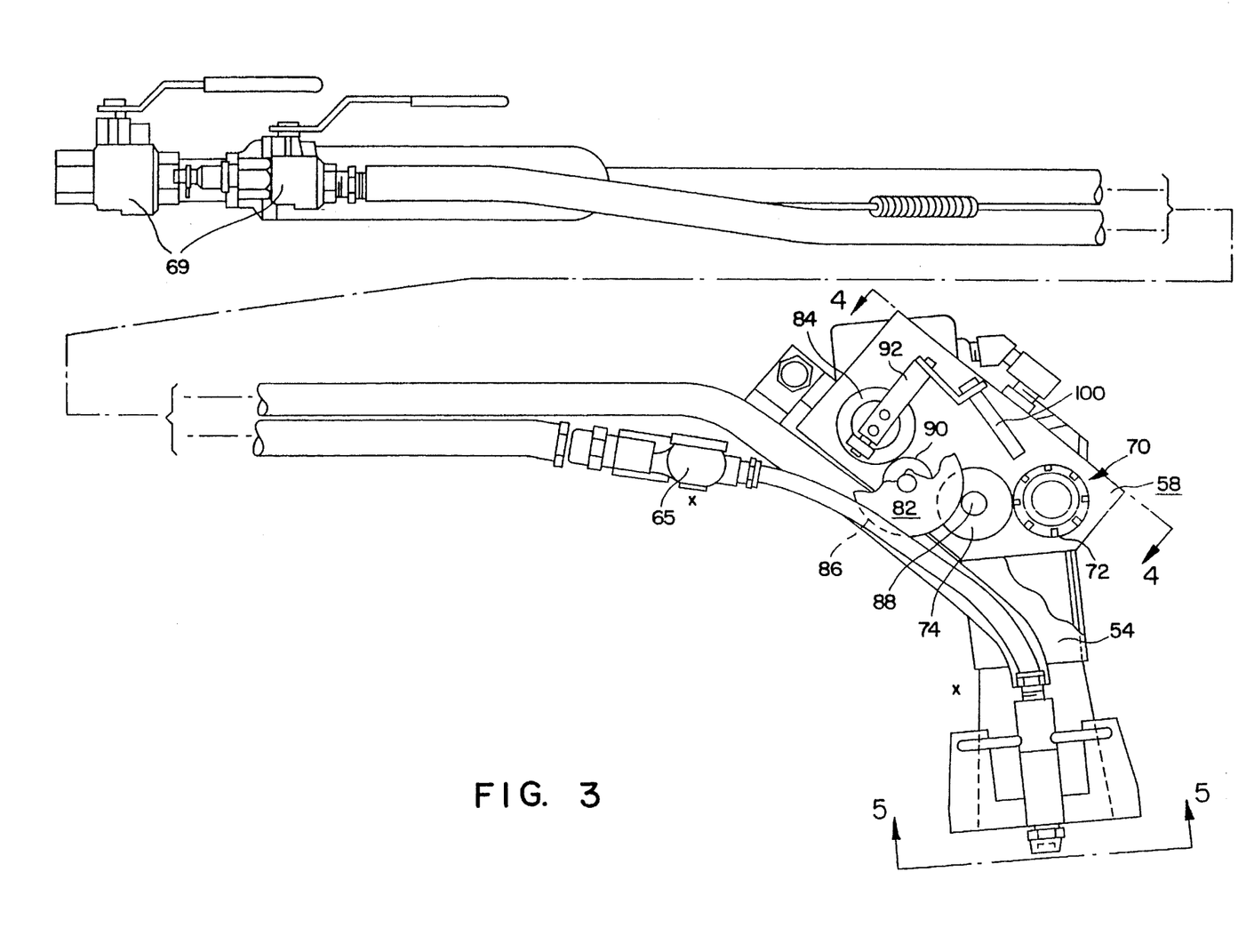
FIG. 3 is a side view of a spray gun.

The spray gun 12 is connected to an air compressor 16 by a first hose 18 and a pump 20 that supplies emulsion through a second hose 22. As shown in FIG. 2, the compressor 16 and pump 20 are both connected to an engine 24. The pump 20 is coupled to the engine by a belt 26 and a pneumatic clutch 28. The pump 20 has an inlet 30 connected to an emulsion reservoir 32. The reservoir 32 has mixing blades 34 driven by a rotating drive shaft 36. Rotation of the blades 34 prevent the emulsion from separating. A vibrating unit 38 may be attached to the reservoir 32 to prevent the emulsion from sticking to the walls.

The pump 20 has an outlet 40 which has a relief valve 42 that can direct the emulsion back into the pump inlet 30 or reservoir 32, when the pressure of the emulsion exceeds a predetermined level. In the preferred embodiment, the pump 20 is a progressive cavity pump 20 that is capable of pumping emulsion at 50 gallons per minute (gpm) at 600 psi. The spray gun 12 typically sprays the emulsion at 15 gpm. The excess capacity of the pump allows the user to incorporate two guns in a system. The use of two guns can greatly decrease the spray time and cost of spraying a working surface. Supplying the emulsion at 600 psi allows the second hose 22 to be constructed from rubber, which decreases the cost and weight of the spray gun.

As shown in FIG. 1, the resin may be provided to the gun by a spool 44 that is attached to a dolly 46. The resin is threaded through a staff 47 that stretches the thread above the operator, to prevent the resin from becoming entangled with another object or person. The resin may be directed through a tube 48 attached to a frame 50 worn by the operator. The tube 48 prevents contact between the fast moving resin and the operator. The dolly 46 has wheels 52 that allow the operator to easily move the resin spool 44 about the working surface.

FIGS. 3–6 show a preferred embodiment of the spray gun 12. The gun has a housing 54 that contains a passage 56. Above the passage 56 is a cutter assembly 58 which cuts the resin into individual strands. The passage 56 is in fluid communication with openings 60 that are coupled to the first hose 18 by a first tube 62. The openings 60 allow the pressurized air from the compressor 16 to flow into the passage 56.

The flow of air through the passage 56 draws the resin strands from the cutter assembly 58 and discharges the strands through an outlet 64 in the housing. The gun may have a valve 65 that controls the air flow through the passage 56. The valve 65 allows the operator to control the resin spray, so that the resin density may be increased for areas of the working surface that are subjected to high stresses.

The strands initially flow through the housing 54 parallel with the longitudinal axis of the passage 56. The openings 60 are located off-center from the center axis of the passage 56, so that the flow of air rotates the strands in a direction perpendicular to the longitudinal axis of the passage and parallel with the working surface. Such an orientation of strands causes the resin to lay flat on the working surface. To further induce the perpendicular flow of the strands, the outlet 64 is preferably constructed to have a slit shaped opening.

Attached to the housing 54 are a pair of nozzles 66 that are coupled to the second hose 22 by a pair of tubes 68. The gun has a pair of cut-off valves 69 that can terminate the flow of fluid through the tubes 62 and 68. The nozzles 66 are constructed and oriented to blow the emulsion into the strands, so that the emulsion and resin mix on the working surface. In the preferred embodiment, the nozzles 66 are adapted to converge the streams of emulsion 2 or 3 inches from the housing outlet 64.

The cutter assembly 58 has a cutting wheel 70 which has a plurality of blades 72 that extend around the circumference of the wheel. The cutting wheel 70 is rotated by a friction wheel 74 that is driven by a pneumatic motor 76. The friction wheel 74 typically has an outer rubber sleeve that allows the blades to engage the wheel 74 without dulling the blades 72. The blades 72 are preferably constructed from a carbide steel to reduce the amount of repair required for the gun. The pneumatic motor 76 is coupled to the first tube 18 by a hose 78. The gun typically has a muffler 80 that reduces the noise of the motor 76.

The friction wheel 74 rotates an intermittent drive wheel 82 which rotates a cam wheel 84. The intermittent drive wheel 82 has a large wheel 86 that engages an output shaft 88 of the friction wheel 74 and a small wheel 90 that engages the cam wheel 84. The large 86 and small 90 wheels are constructed to provide a speed reduction between the friction wheel 74 and the cam wheel 84. In the preferred embodiment, the intermittent drive wheel 82 provides a 10:1 speed reduction.

Figures 4, 5, 6:
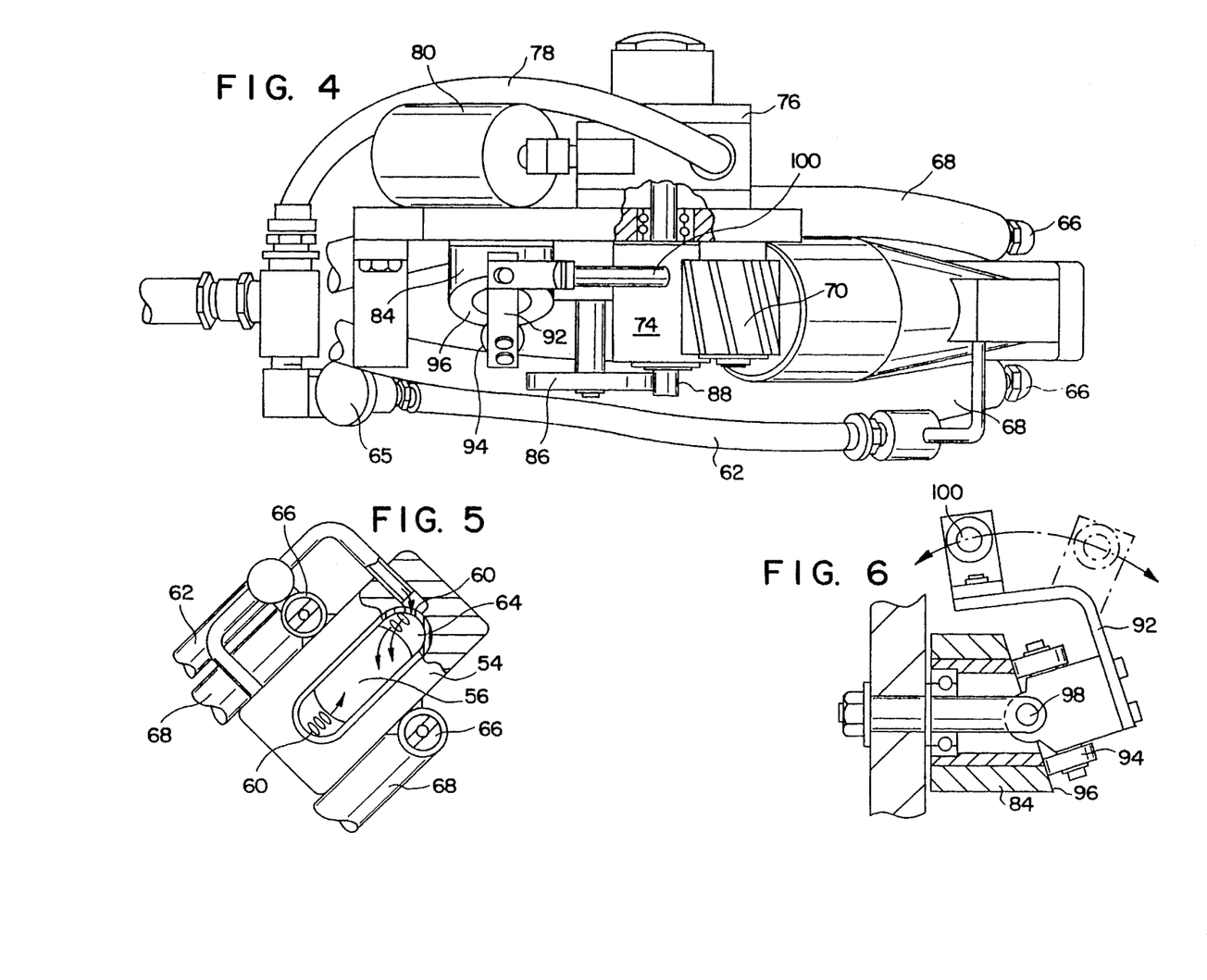
FIG. 4 is a top view of the spray gun taken at line 4—4 of FIG. 3.
FIG. 5 is a bottom view of the spray gun taken at line 5—5 of FIG. 3.
FIG. 6 is a sectional view of the spray gun showing a cam assembly that moves a feeder tube.

As shown in FIG. 6, the assembly 58 includes a cam follower 92 which has a pair of follower wheels 94 that engage an oblique surface 96 of the cam wheel 84. The wheels 88 rotate about a pin 98 when the cam wheel 84 is rotated by the intermittent drive wheel 82. The follower 92 is attached to a feeder tube 100, which moves in the direction indicated by the arrows.

Figure 7:
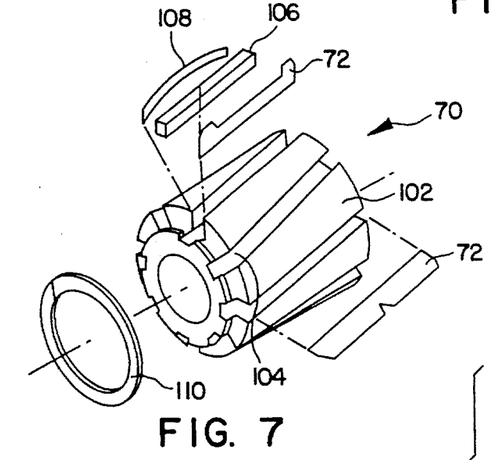
FIG. 7 is a cutter wheel assembly of the spray gun.
Figure 8:
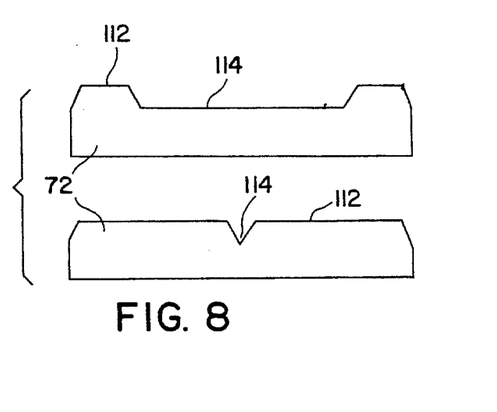
FIG. 8 is a side view of a pair of blades.

As shown in FIG. 7, the cutting wheel 70 has a housing 102 with a plurality of slots 104. The slots 104 receive the blades 72 which are secured to the housing by a shim bar 106 and a steel spring 108. The blades are further attached to the housing by a clip 110. As shown in FIG. 8, each blade 72 has a cutting edge 112 and a notch 114 which has a depth greater than the diameter of the resin thread, so that when the thread falls into a notch 114 the blade 72 does not cut the resin. The width of each notch 114 is different for each blade 72, wherein the thread may be cut by one blade but not another blade as the cutting wheel 70 is rotated relative to the resin.

The resin is threaded through the feeder tube 100 and between the friction 74 and cutting 70 wheels. When the cutting wheel 70 is rotated, a blade 72 is brought into contact with the resin to cut the thread into a single strand. The friction wheel 74 continually feeds the resin into the cutting wheel 70, so that the rotating blades 72 cut a plurality of individual strands. The length of a strand is dependent upon the number of notches (if any) that the thread falls into before being cut by the cutting edge of a blade. The length of the strand is increased every time the resin falls within a notch 114.

The cam wheel 84 and follower 92 move the feeder tube 100 and resin along the length of the blades 72 to vary when the resin will fall into a notch 114. The combination of varying notches 114 and the moving feeder tube 100 creates a cutter assembly that cuts strands of varying lengths. In the preferred embodiment, the cutter assembly 58 is constructed to cut long strands greater than 3 inches and short strands no greater than 3 inches. The long strands are typically approximately 24 inches long.

Figure 9:
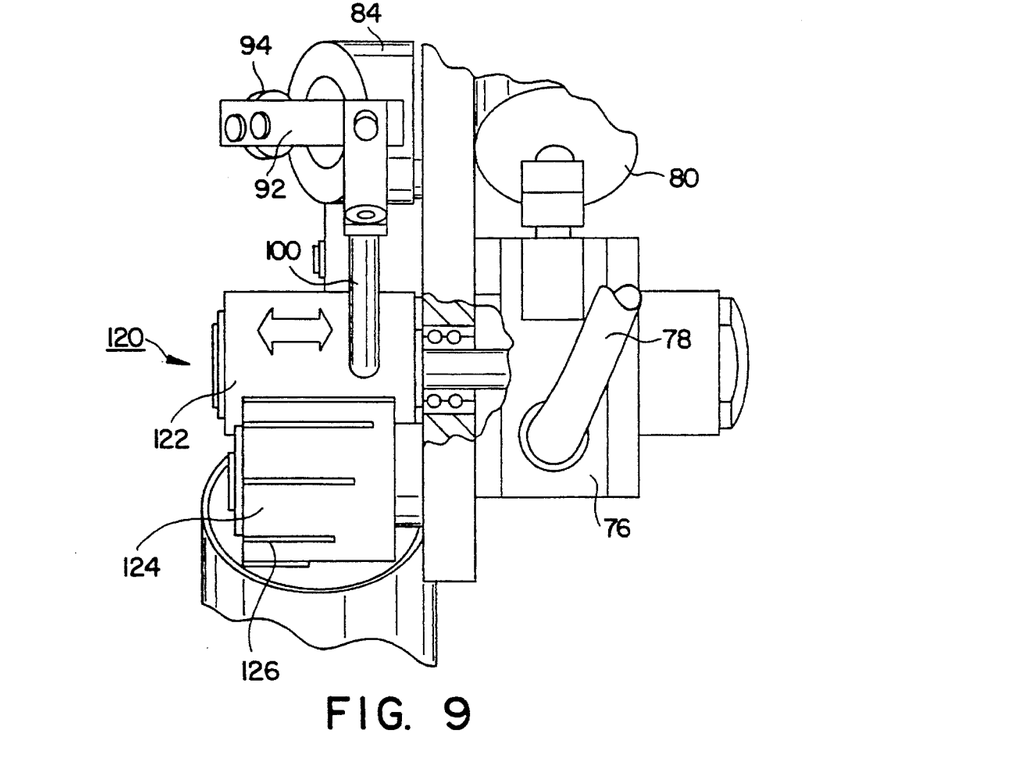
FIG. 9 is an alternate embodiment of the spray gun.

FIG. 9 shows an alternate cutter assembly 120 of the present invention. In this embodiment the resin is fed by a friction wheel 122 into a cutting wheel 124. The cutting wheel 124 which has a plurality of blades 126 that each have a different length. The varying blade lengths produce strands of different lengths in a manner similar to the cutter assembly shown in FIGS. 3–6 and described above. The length of the strand will depend upon when the thread comes into contact with a blade 126 as the cutting wheel is being rotated. The blades may also have notches adapted to cut the resin. The notches of each blade may have a different diameter so that each notch penetrates the resin to a depth different from the other notches. The resin is typically constructed from a plurality of individual twisted fibers, so that each notch will cut a different amount of fibers. The varying notch depths also produces strands of varying lengths. The varying notch concept may also be used in the embodiment shown in FIGS. 3–6. The feeder tube 100 may be fixed or moving in accordance with a cam wheel 84 and follower 92.

Figure 10:
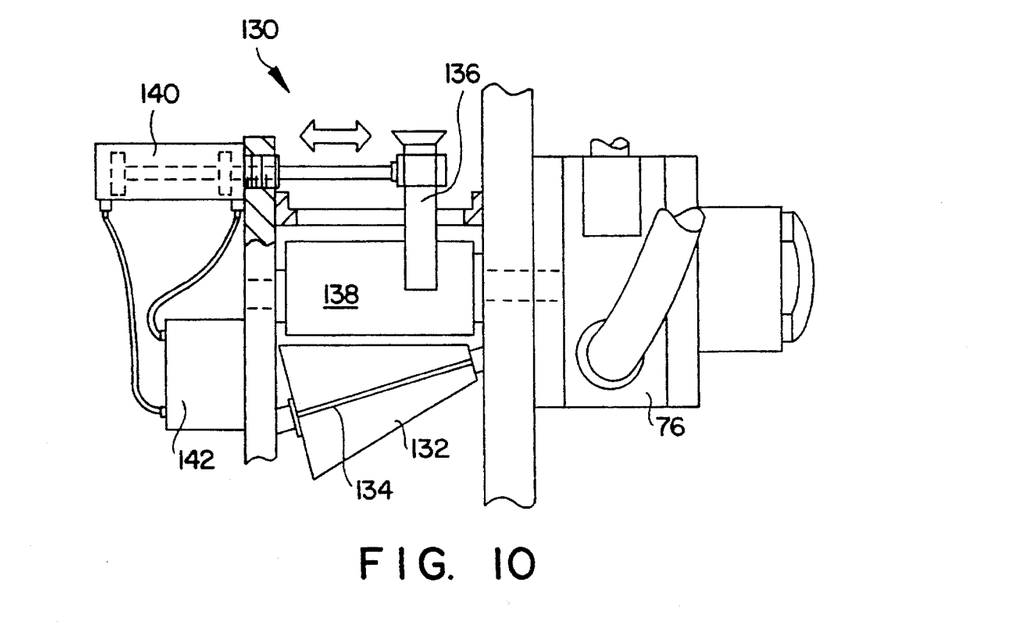
FIG. 10 is an alternate embodiment of the spray gun.

FIG. 10 shows an alternate cutter assembly 130 which has a cone shaped cutting wheel 132 that has a blade 134. The assembly 130 has a feeder tube 136 and a friction wheel 138 that feed resin into the cone shaped cutting wheel 132. The feeder tube 136 is moved by a pneumatic actuator 140. The actuator 140 is cycled by a control valve 142 between a retracted position and an extended position. Moving the feeder tube 136 changes the distance between the tube 136 and the blade 134, so that the assembly 130 produces a strand with a different length every time the blade rotates into contact with the resin.

Figure 11:
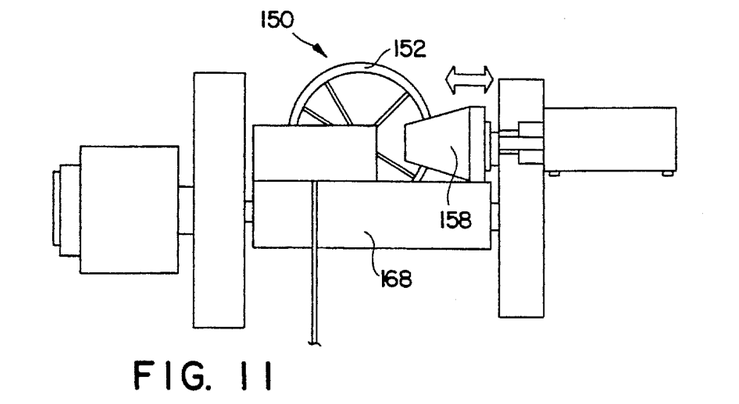
FIG. 11 is an alternate embodiment of the spray gun.
Figure 12:
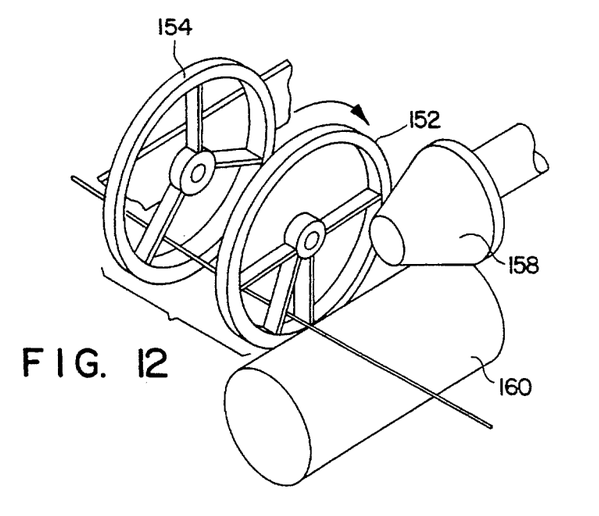
FIG. 12 is an exploded view of the embodiment of FIG. 11.

FIGS. 11 and 12 show an alternate cutter assembly 150 which has a first rotating blade 152 that rotates in a first direction and a second rotating blade 154 that is either stationary or rotates in a second opposite direction. The blades have cutting edges and are assembled so that the blades periodically come into close proximity during rotation. The resin is feed between the blades by a friction wheel 156, so that the resin is cut in a scissors-like fashion when the blades pass each other. The first rotating blade 152 is driven by a friction cone 158. The friction cone 158 is driven by a drive roller 160. The friction cone 158 moves to vary the diameter of the cone that is in contact with the blade 152. The varying cone diameter changes the speed of the blade 152. The change in blade speed varies the length of the strands. The friction cone 158 can be moved by a pneumatic actuator and valve shown in FIG. 10.

Figure 13:
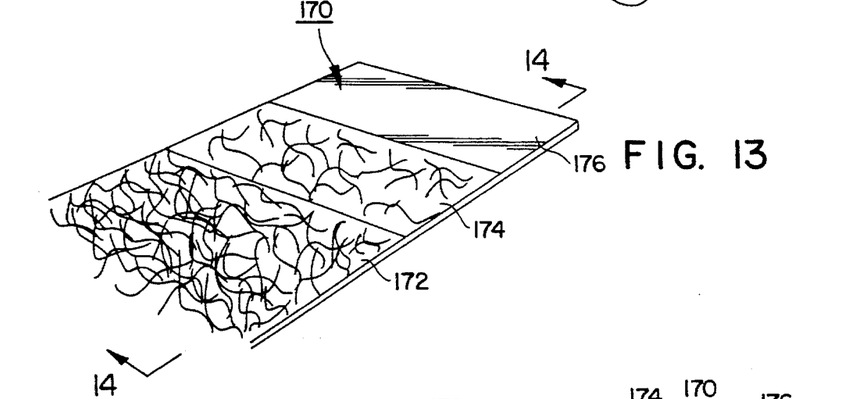
FIG. 13 is a top view of an emulsion/resin composition of the present invention.
Figure 14:
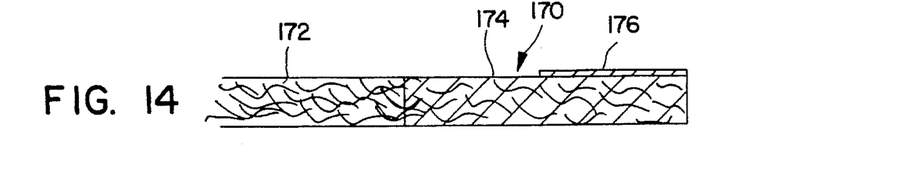
FIG. 14 is a cross-sectional view of the composition of FIG. 13.

FIGS. 13 and 14 show a composition 170 of the present invention. The composition includes resin strands 172 embedded in an emulsion 174. In one embodiment the resin strands are all of the same length and longer than 3 inches. It has been found that strands of such length will intertwine in an irregular pattern and increase the strength of the resulting composition. In another embodiment, the resin strands have varying lengths. In the preferred embodiment, the emulsion/resin composition will have long strands greater than 3 inches and short strands no greater than 3 inches. The long strands are preferably 24 inches in length. It has been found that the combination of short strands blown in with long strands provides a resin mesh that is much stronger than emulsion/resin compositions in the prior art.

The emulsion is preferably a combination of water, asphalt and clay. In the preferred embodiment the emulsion is 50% water, 47% asphalt and 3% clay by volume. The composition is typically produced by a spray that has a ratio of 8 pounds of fiberglass per 15 gallons of emulsion. It is also preferable to add latex to the emulsion to increase the flexibility of the composition and make the material more resistive to water. The addition of latex to the emulsion has not been found to trap water during the evaporation cycle of the emulsion. A second layer of metal filled emulsion 176 may be sprayed on top of the resin impregnated emulsion. The metal may be an aluminum which creates UV protection and a reflective surface that reduces the amount of solar heat.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for creating a composition on a surface, comprising the steps of:
   a) cutting a plurality of strands that each have a longitudinal axis into a group of short strands and a group of long strands;
   b) spraying said strands onto the surface with a spray gun so that the longitudinal axis of said long strands is essentially perpendicular to a spray gun passage opening, wherein the flow of said long strands induces said strands to lie flat on the surface; and,
   c) spraying emulsion onto the surface such that said strands are embedded into said emulsion.

2. The method as recited in claim 1, wherein said emulsion is sprayed simultaneously with said spraying of said strands.

3. The method as recited in claim 1, wherein said emulsion is sprayed onto the surface after said strands are sprayed onto the surface.

4. The method as recited in claim 1, wherein at least one of said strands is cut to a length greater than 3 inches.

5. The method as recited in claim 1, further comprising the step of allowing said strand filled emulsion to solidify and spraying a metal filled emulsion onto said solid strand filled emulsion.

6. A method for creating a composition on a surface, comprising the steps of:
   a) cutting a plurality of long strands having lengths of up to approximately twenty-four inches;
   b) cutting a plurality of short strands having lengths no greater than three inches;
   c) spraying said long and short strands onto the surface such that said long and short strands are intertwined; and,
   d) spraying emulsion onto the surface such that said long and short strands are embedded into said emulsion.

7. The method as recited in claim 6, wherein said emulsion is sprayed simultaneously with said spraying of said strands.

8. The method as recited in claim 6, wherein said emulsion is sprayed onto the surface after said strands are sprayed onto the surface.

9. The method as recited in claim 6, further comprising the step of allowing said strand filled emulsion to solidify and spraying a metal filled emulsion onto said solid strand filled emulsion.

* * * * *